United States Patent
Wan et al.

(10) Patent No.: US 9,693,118 B2
(45) Date of Patent: Jun. 27, 2017

(54) SYSTEMS AND METHODS FOR PRIORITIZING ADAPTIVE BIT RATE DISTRIBUTION OF CONTENT

(71) Applicant: BROADCOM CORPORATION, Irvine, CA (US)

(72) Inventors: Wade Keith Wan, Orange, CA (US); Xuemin Chen, Rancho Santa Fe, CA (US); Brian Allan Heng, Irvine, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 926 days.

(21) Appl. No.: 13/929,695

(22) Filed: Jun. 27, 2013

(65) Prior Publication Data

US 2014/0359076 A1    Dec. 4, 2014

Related U.S. Application Data

(60) Provisional application No. 61/828,632, filed on May 29, 2013.

(51) Int. Cl.
| | | |
|---|---|---|
| G06F 15/16 | (2006.01) | |
| H04N 21/854 | (2011.01) | |
| H04N 21/2343 | (2011.01) | |
| H04N 21/262 | (2011.01) | |
| H04N 21/845 | (2011.01) | |
| H04L 29/06 | (2006.01) | |
| H04L 12/801 | (2013.01) | |

(52) U.S. Cl.
CPC .. *H04N 21/85406* (2013.01); *H04N 21/23439* (2013.01); *H04N 21/26258* (2013.01); *H04N 21/8456* (2013.01); *H04L 47/10* (2013.01); *H04L 65/60* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 2009/0222855 | A1* | 9/2009 | Vare | H04L 12/189 725/39 |
| 2011/0161485 | A1* | 6/2011 | George | H04L 65/80 709/224 |
| 2014/0313989 | A1* | 10/2014 | Doken | H04L 65/605 370/329 |

OTHER PUBLICATIONS

Adaptive bitrate streaming | Wikipedia, http://en.wikipedia.org/wiki/Adaptive_bitrate_streaming, visited Oct. 20, 2011.

* cited by examiner

*Primary Examiner* — Padma Mundur
(74) *Attorney, Agent, or Firm* — McDermott Will & Emery LLP

(57) ABSTRACT

Systems and methods for prioritizing adaptive bit rate distribution of content are provided. In some aspects, a method includes identifying a plurality of content streams. Each of the plurality of content streams is associated with a variant feature of content to be delivered to the client device. Each variant feature of the content comprises at least one of a bit rate and a non-bit rate feature. The method also includes determining a priority of each of the plurality of content streams relative to one another based at least on the non-bit rate feature associated with each of the plurality of content streams. The method also includes providing an indication of the priority of each of the plurality of content streams to the client device.

20 Claims, 4 Drawing Sheets

SYSTEMS AND METHODS FOR PRIORITIZING ADAPTIVE BIT RATE DISTRIBUTION OF CONTENT

CROSS-REFERENCES TO RELATED APPLICATIONS

The present application claims the benefit of U.S. Provisional Patent Application Ser. No. 61/828,632, titled "Systems and Methods for Prioritizing Adaptive Bit Rate Distribution of Multicast Content," filed on May 29, 2013, which is hereby incorporated by reference in its entirety for all purposes.

FIELD

The subject technology generally relates to prioritizing content and, in particular, relates to systems and methods for prioritizing adaptive bit rate distribution of content.

BACKGROUND

Adaptive bit rate streaming is a technique used in streaming multimedia over networks. It involves detecting a user device's bandwidth and central processing unit (CPU) capacity in real time, and adjusting the quality of a multimedia stream accordingly. An encoder, for example, may be used to encode a single multimedia source at multiple bit rates. The user device may switch between streaming the different encodings depending on available resources. As a result, adaptive bit rate streaming requires little to no buffering, has fast start times, and can be used for both high-end and low-end connections.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Figure 1:
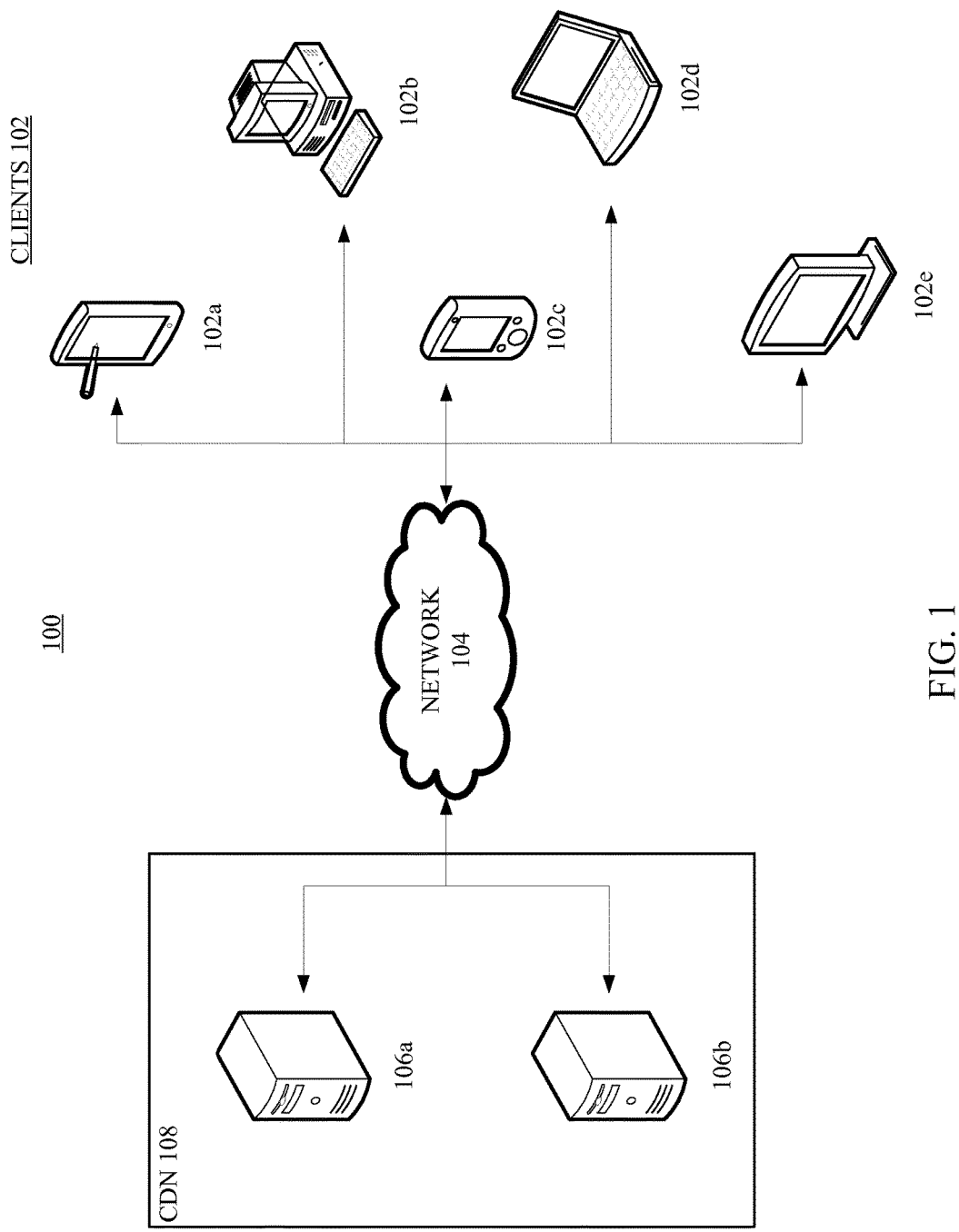
FIG. 1 illustrates an example of an environment in which adaptive bit rate streaming may be used, in accordance with various aspects of the subject technology.

FIG. 1 illustrates an example of environment 100 in which adaptive bit rate streaming may be used, in accordance with various aspects of the subject technology. Environment 100 includes content delivery network (CDN) 108 and client devices 102 (e.g., client devices 102a, 102b, 102c, 102d, and 102e). CDN 108 includes servers 106 (e.g., servers 106a and 106b). One goal of CDN 108 is to serve content to client devices 102 with high availability and high performance. In some aspects, the phrase "content delivery network," as used herein, encompasses its plain and ordinary meaning (e.g., as understood by those of ordinary skill in the art). In some aspects, the phrase "content delivery network," as used herein, refers to any entity that delivers content (e.g., a cable head-end that delivers content as an analog and/or a digital cable transmission, a satellite television provider that delivers content as a satellite transmission, any one or more devices that deliver content to another device, etc.).

As shown in FIG. 1, CDN 108 and client devices 102 are connected over network 104. Network 104 can include, for example, any one or more of a personal area network (PAN), a local area network (LAN), a campus area network (CAN), a metropolitan area network (MAN), a wide area network (WAN), a broadband network (BBN), a peer-to-peer network, an ad-hoc network, the Internet, and the like. Further, network 104 can include, but is not limited to, any one or more network topologies such as a bus network, a star network, a ring network, a mesh network, a star-bus network, tree or hierarchical network, and the like.

Client devices 102 and servers 106 can be any electronic device having processing hardware, memory, and communications capability necessary to perform some or all of the operations disclosed herein. Client devices 102, for example, can be desktop computers (e.g., client device 102b), mobile computers (e.g., client device 102d), tablet computers (e.g., client device 102a), mobile devices (e.g., smartphones or personal digital assistants such as client device 102c), set top boxes (e.g., including televisions with one or more processors coupled thereto and/or embedded therein, such as client device 102e), video game consoles, or any other electronic devices having memory, processing hardware, and communications capabilities for receiving content from servers 106. Servers 106 may be adaptive bit rate (ABR) servers that provide content over network 104 to client devices 102.

Figure 2:
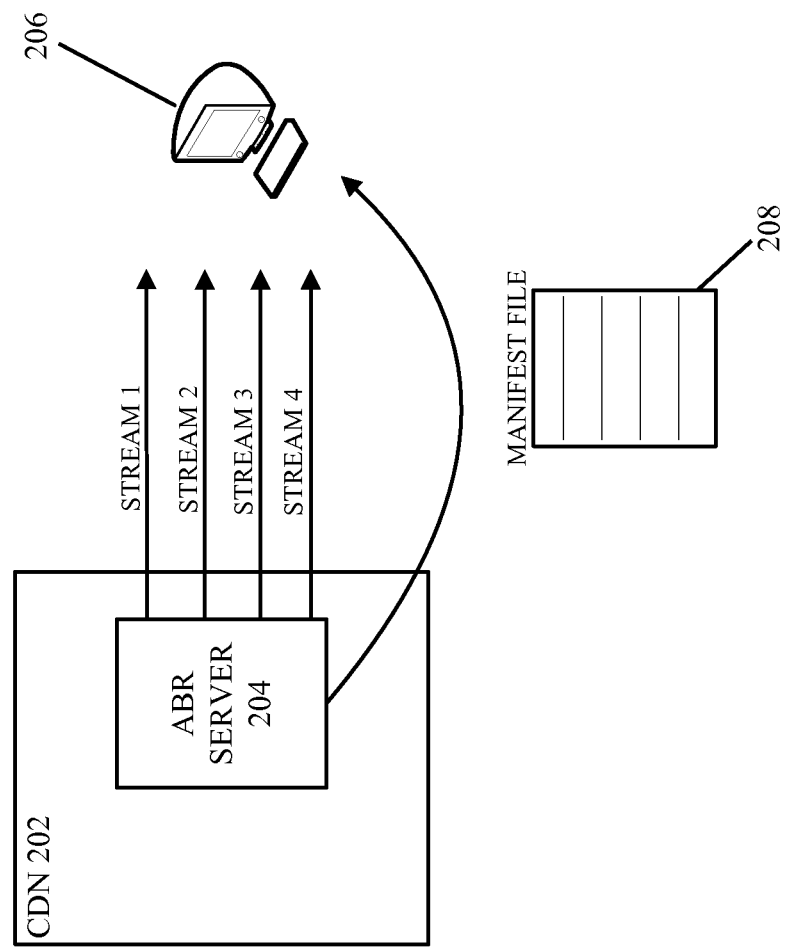
FIG. 2 illustrates an example of an adaptive bit rate server providing content to a particular client device, in accordance with various aspects of the subject technology.

FIG. 2 illustrates an example of ABR server 204 providing content to a particular client device 206, in accordance with various aspects of the subject technology. As shown in FIG. 2, ABR server 204 is part of CDN 202. In an adaptive bit rate streaming system, ABR server 204 may deliver content, such as video and/or audio, to client device 206 in different content streams (e.g., shown in FIG. 2 as stream 1, stream 2, stream 3, and stream 4). Each of these streams may comprise a different version of the content. For example, each stream may comprise one or more segments of the content (e.g., each segment may have a duration of 2-10 seconds). The segments of one stream may be a different variant of the segments of another stream (e.g., segments from different streams may be encoded at different bit rates). Providing different versions of the content to client device 206 allows client device 206 to receive the content in a way that is most appropriate for itself. For example, client device 206 may select a stream at a bit rate that it is capable of receiving based on its computing resources and available bandwidth.

ABR server 204 may determine the particular streams that client device 206 is likely able to receive and may advertise these streams as being available to the client device. When advertising to client device 206, ABR server 204 may rank these streams in order from the highest bit rates available to the lowest bit rates available, thereby prioritizing the streams according to bit rates. For example, ABR server 204 may generate, and send to client device 206, manifest file 208 that lists the available streams in their ranked order, the different bit rates at which each of these streams has been encoded, and a network identifier for accessing each segment of a corresponding stream (e.g., a uniform resource locator (URL)). Thus, manifest file 208 provides an indication to client device 206 of which streams are available according to bit rates.

Client device 206 may retrieve each stream at the bit rate that is appropriate for itself (e.g., based on network bandwidth conditions that are determinable by client device 206). In this manner, client device 206 may adaptively retrieve streams that are encoded at different bit rates in accordance with changing network bandwidth conditions. However, because ABR server 204 advertises the streams that are available by prioritizing the ones with the highest available bit rates, other features that are relevant to whether client device 206 should receive a particular stream are not even considered.

According to various aspects of the subject technology, instead of relying solely on bit rates for prioritization, systems and methods are provided for prioritizing adaptive bit rate distribution of content based at least on non-bit rate features. The non-bit rate features may include codecs, frame rates, resolutions, formats, and/or other features that may be relevant to whether client device 206 should receive a particular stream. For example, a non-bit rate feature may be any feature that helps provides an objective and/or subjective indication of whether a particular stream is better in quality (or is otherwise more desirable) than another stream.

Figure 3:
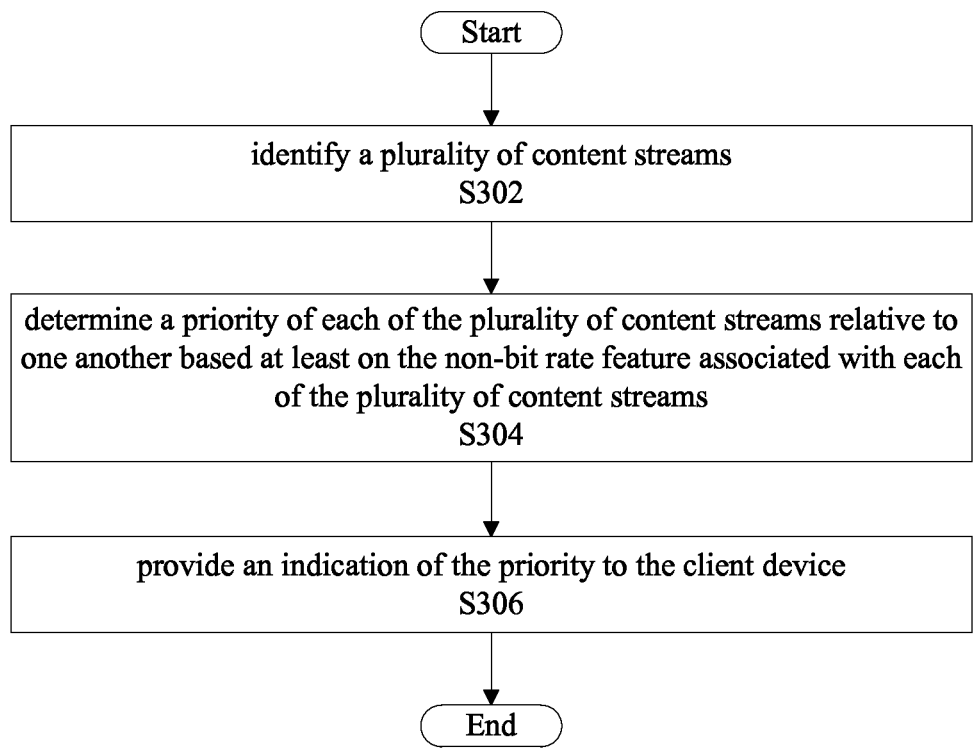
FIG. 3 illustrates an example of a method for prioritizing adaptive bit rate distribution of content based at least on non-bit rate features, in accordance with various aspects of the subject technology.

FIG. 3 illustrates an example of method 300 for prioritizing adaptive bit rate distribution of content based at least on non-bit rate features, in accordance with various aspects of the subject technology. Method 300 is described herein with reference to FIG. 2. However, method 300 is not limited to the examples presented in FIG. 2. Furthermore, although method 300 is illustrated in the order shown in FIG. 3, it is understood that method 300 may be implemented in a different order.

According to S302, ABR server 204 identifies a plurality of streams of content (e.g., stream 1, stream 2, stream 3, and stream 4 in FIG. 2) to provide to client device 206. Each of these streams may be associated with a variant feature of the content to be delivered to client device 206. The variant feature may include a bit rate and/or a non-bit rate feature of the content. According to certain aspects, the variant features of the streams may be different from one another (e.g., each stream may be associated with a unique combination of a bit rate and a non-bit rate feature). As discussed above, the non-bit rate feature may be a codec that the content is encoded with (e.g., Moving Picture Experts Group (MPEG), advanced video coding (AVC), high efficiency video coding (HEVC), etc.), a frame rate of the content (e.g., 30 frames per second (fps), 60 fps, etc.), a resolution of the content (e.g., 1920×1080 pixels, 1280×720 pixels, etc.), a format of the content (e.g., progressively scanned, interlaced, etc.), and/or another suitable feature.

According to S304, ABR server 204 determines a priority of each of the streams relative to one another based at least on the non-bit rate feature associated with each stream. In one or more implementations, ABR server 204 may identify different content consumption conditions such as a capability of client device 206, a preference of a user of client device 206, and/or a type of the content being provided. ABR server 204 may determine whether the non-bit rate feature associated with each stream matches one or more of the content consumption conditions (e.g., whether the non-bit rate feature of a stream would enable a user of client device 206 to receive and consume the content in view of the content consumption conditions). ABR server 204 may assign a priority level to each stream based on how closely the non-bit rate feature of a stream matches the particular content consumption conditions (e.g., the greater the match, the higher the priority level). ABR server 204 may rank the streams based on the assigned priority levels.

In one example, a user of client device 206 may prefer higher resolution video, and therefore, the priority of each stream may be based at least on the resolution associated with each stream. Assume that stream 1 and stream 2 are each a stream of video being provided to client device 206. A bit rate of stream 1 may be 3 megabits per second (mbps), while a bit rate of stream 2 may be 3.1 mbps. The video for stream 1 may have a resolution of 1920×1080 pixels and a format of progressive scan (e.g., 1080p), while the video for stream 2 may have a resolution of 1280×720 pixels and a format of progressive scan (e.g., 720p). Even though stream 2 may have a higher bit rate than stream 1, ABR server 204 may nevertheless determine that stream 1 has higher priority than stream 2 because the video for stream 1 has higher resolution than the video for stream 2.

In another example, the priority of each stream may be based at least on the quality of a codec associated with each stream. Assume that stream 3 and stream 4 are each a stream of video being provided to client device 206. A bit rate of stream 3 may be 8 mbps, while a bit rate of stream 4 may be 6 mbps. The video for stream 3 may be encoded in MPEG-2, while the video for stream 4 may be encoded in AVC. Even though stream 3 may have a higher bit rate than stream 4, ABR server 204 may nevertheless determine that stream 4 has higher priority than stream 3 because stream 4 provides video encoded in AVC, which is generally regarded as more coding efficient (and provides better quality) than MPEG-2.

In another example, client device 206 may be receiving a particular type of content in which a frame rate of the content can substantially impact the way in which the content is consumed. As a result, the priority of each stream may be based at least on the frame rate associated with each stream. For example, the content being delivered to client device 206 may be a live stream of a sporting event (as opposed to another type of content such as a film). Since sporting events typically involve high-speed activity, higher frame rates may be better suited for delivering this type of content. Assume stream 1 and stream 2 are each a stream of a sporting event being provided to client device 206. The bit rate for both stream 1 and stream 2 may be 3 mbps, but stream 1 may be 1080p and have a frame rate of 30 fps, while stream 2 may be 720p and have a frame rate of 60 fps. Since stream 2 has a higher frame rate than stream 1, ABR server 204 may determine that stream 2 has higher priority than stream 1. Note, however, that if the content were a film, the priority of each stream may be based at least on the resolution associated with each stream, since a higher resolution may generally be better for films. In this case, ABR server 204 may determine that stream 1 has higher priority than stream 2.

Although the foregoing examples illustrate the priority of the streams being determined based on a single non-bit rate feature, it is understood that the priority of the streams can be determined based on a combination of different features (e.g., either bit rate and/or non-bit rate features). In such a situation, different weights may be assigned to each feature. Thus, streams that have higher priority in the more heavily weighted features may be considered as having higher priority overall than other streams. In some aspects, the streams may be prioritized according to a combination of weights that contribute to an expected quality of a consumption experience.

According to S306, ABR server 204 may provide an indication of the priority of each stream to client device 206. In one or more implementations, ABR server 204 may generate manifest file 208, which may list the streams in order of their ranking ABR server 204 may transmit manifest file 208 to client device 206 so that client device 206 may request an appropriate stream to receive.

Although method 300 describes that ABR server 204 determines a priority of each of the streams, it is understood that client device 206 may, alternatively or additionally, determine the priority of each of the streams in the same or similar manner as ABR server 204. In one or more implementations, client device 206 may receive from ABR server 204 manifest file 208, which lists the streams along with the variant feature associated with each stream. Client device 206 may determine a priority of each of the streams relative to one another based on the variant feature of each stream. Based on the determined priority, client device 206 may request an appropriate stream to receive.

Figure 4:
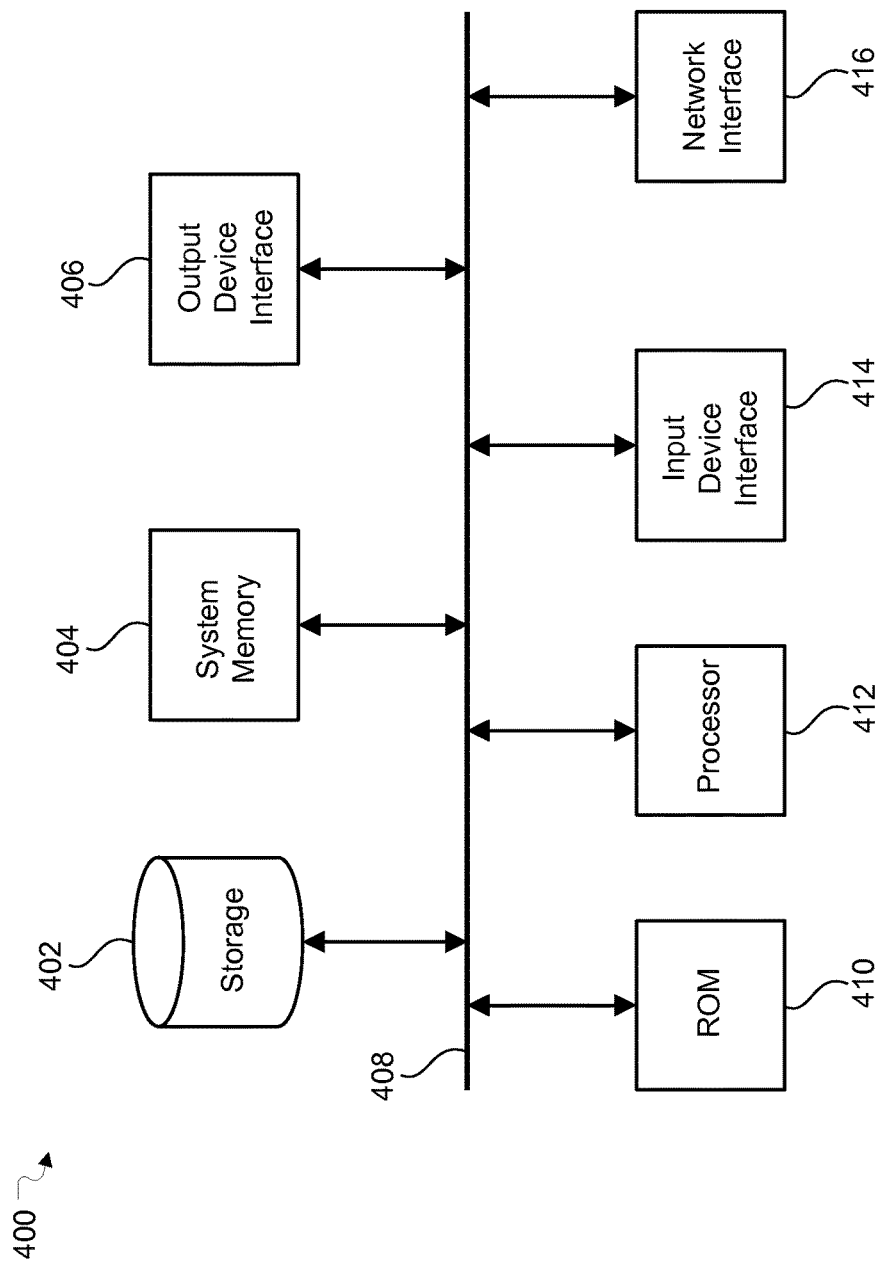
FIG. 4 conceptually illustrates an electronic system with which aspects of the subject technology may be implemented.

FIG. 4 conceptually illustrates electronic system 400 with which aspects of the subject technology may be implemented. Electronic system 400, for example, can be a desktop computer, a laptop computer, a tablet computer, a server, a switch, a router, a base station, a receiver, a phone, a personal digital assistant (PDA), any device that prioritizes adaptive bit rate distribution of content, or generally any electronic device that transmits signals over a network. Such an electronic system includes various types of computer readable media and interfaces for various other types of computer readable media. Electronic system 400 includes bus 408, processing unit(s) 412, system memory 404, read-only memory (ROM) 410, permanent storage device 402, input device interface 414, output device interface 406, and network interface 416, or subsets and variations thereof.

Bus 408 collectively represents all system, peripheral, and chipset buses that communicatively connect the numerous internal devices of electronic system 400. In one or more implementations, bus 408 communicatively connects processing unit(s) 412 with ROM 410, system memory 404, and permanent storage device 402. From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. One or more implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as random access memory. System memory 404 stores any of the instructions and data that processing unit(s) 412 needs at runtime. In one or more implementations, the processes of the subject disclosure are stored in system memory 404, permanent storage device 402, and/or ROM 410. From these various memory units, processing unit(s) 412 retrieves instructions to execute and data to process in order to execute the processes of one or more implementations.

Bus 408 also connects to input and output device interfaces 414 and 406. Input device interface 414 enables a user to communicate information and select commands to the electronic system. Input devices used with input device interface 414 include, for example, alphanumeric keyboards and pointing devices (also called "cursor control devices"). Output device interface 406 enables, for example, the display of images generated by electronic system 400. Output devices used with output device interface 406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, bus 408 also couples electronic system 400 to a network (not shown) through network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While one or more implementations described herein may be software processes executed by microprocessors or multi-core processors, the one or more implementations may also be performed by one or more integrated circuits, such as application specific integrated circuits (ASICs) or field programmable gate arrays (FPGAs). Such integrated circuits, for example, may execute instructions that are stored on the circuit itself.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method implemented at a content server to prioritize adaptive bit rate distribution of content, the method comprising:

identifying a plurality of content streams comprising a same content, wherein each of the plurality of content streams is associated with at least one of a bit rate feature and a non-bit rate feature, the non-bit rate feature comprising at least one of a codec that the content is encoded with, a frame rate of the content, a resolution of the content, or a format of the content;

assigning, by the content server, a priority to each of the plurality of content streams, the assigning comprising:

identifying, by the content server, a first one of the plurality of content streams that is associated with a first non-bit rate feature that matches a content consumption condition associated with delivery of the content to a client device, wherein the first one of the plurality of content streams is associated with a first bit rate;

identifying, by the content server, a second one of the plurality of content streams that is associated with a second non-bit rate feature that matches the content consumption condition, wherein the second one of the plurality of content streams is associated with a second bit rate that is greater than the first bit rate, and the second non-bit rate feature is associated with a lower quality than the first non-bit rate feature; and determining, by the content server, the priority assigned to each of the first and the second ones of the plurality of content streams relative to one another based at least on the identified first and second non-bit rate features, wherein the first one of the plurality of content streams is assigned a higher priority than the second one of the plurality of content streams; and providing an indication of the priority assigned to each of the plurality of content streams to the client device.

2. The method of claim 1, wherein the content comprises at least one of video and audio.

3. The method of claim 1, wherein the priority is determined based on the bit rate and the non-bit rate features associated with the first and second ones of the plurality of content streams.

4. The method of claim 1, wherein determining the priority further comprises ranking the plurality of content streams based on the assigned priority of each of the plurality of content streams.

5. The method of claim 4, further comprising generating a manifest file based on the ranking, and wherein the indication of the priority comprises the manifest file.

6. A system to prioritize adaptive bit rate distribution of content at a content server, the system comprising:
memory comprising instructions for prioritizing adaptive bit rate distribution of content; and
at least one processor coupled to the memory configured to execute the instructions to:
identify a plurality of content streams comprising a same content, wherein each of the plurality of content streams is associated with at least one of a bit rate feature and a non-bit rate feature, the non-bit rate feature comprising at least one of a codec that the content is encoded with, a frame rate of the content, a resolution of the content, or a format of the content;
assign a priority to each of the plurality of content streams, the assigning comprising:
identifying, a first one of the plurality of content streams that is associated with a first non-bit rate feature that matches a content consumption condition associated with delivery of the content to a client device, wherein the first one of the plurality of content streams is associated with a first bit rate;
identifying a second one of the plurality of content streams that is associated with a second non-bit rate feature that matches the content consumption condition, wherein the second one of the plurality of content streams is associated with a second bit rate that is greater than the first bit rate, and the second non-bit rate feature is associated with a lower quality than the first non-bit rate feature; and determining the priority assigned to each of the first and the second ones of the plurality of content streams relative to one another based at least on the identified first and second non-bit rate features, wherein the first one of the plurality of content streams is assigned a higher priority than the second one of the plurality of content streams; and
provide an indication of the assigned priority of each of the plurality of content streams to the client device.

7. The system of claim 6, wherein the priority is determined based on the bit rate and the non-bit rate features associated with the first and second ones of the plurality of content streams.

8. The system of claim 6, wherein the at least one processor is further configured to rank the plurality of content streams based on the assigned priority of each of the plurality of content streams.

9. The system of claim 8, wherein the at least one processor is further configured to generate a manifest file based on the ranking, and wherein the indication of the priority comprises the manifest file.

10. A computer program product comprising instructions stored in a tangible non-transitory computer-readable storage medium, the instructions comprising:
instructions to identify a plurality of content streams having a same content, wherein each of the plurality of content streams is associated with at least one of a bit rate feature and a non-bit rate feature, the non-bit rate feature comprising at least one of a codec that the content is encoded with, a frame rate of the content, a resolution of the content, or a format of the content;
instructions to assign, by a content server, a priority to each of the plurality of content streams, the instructions to assign comprising:
instructions to identify, by the content server, a first one of the plurality of content streams that is associated with a first non-bit rate feature that matches a content consumption condition associated with delivery of the content to a client device, wherein the first one of the plurality of content streams is associated with a first bit rate;
instructions to identify, by the content server, a second one of the plurality of content streams that is associated with a second non-bit rate feature that matches the content consumption condition, wherein the second one of the plurality of content streams is associated with a second bit rate that is greater than the first bit rate, and the second non-bit rate feature is associated with a lower quality than the first non-bit rate feature; and
instructions to determine, by the content server, the priority assigned to each of the first and the second ones of the plurality of content streams relative to one another based at least on the identified first and second non-bit rate features, wherein the first one of the plurality of content streams is assigned a higher priority than the second one of the plurality of content streams; and
instructions to provide an indication of the assigned priority of each of the plurality of content streams to the client device.

11. The computer program product of claim 10, wherein the content comprises at least one of video and audio.

12. The method of claim 1, wherein the format of the content comprises at least one of progressive scan or interlace.

13. The system of claim 6, wherein the content server comprises an adaptive bit rate server.

14. The computer program product of claim 10, wherein the content server comprises an adaptive bit rate server.

15. The method of claim 1, wherein the content server comprises an adaptive bit rate server.

16. The system of claim 6, wherein the codec comprises at least one of a advanced video coding (AVC) code or a high efficiency video coding (HEVC) codec.

17. The computer program product of claim 10, wherein the codec comprises at least one of a advanced video coding (AVC) code or a high efficiency video coding (HEVC) codec.

18. The method of claim 1, wherein the content consumption condition is associated with at least one of a capability of the client device, a preference associated with a user of the client device, or a content type of the content.

19. The system of claim 6, wherein the content consumption condition is associated with at least one of a capability of the client device, a preference associated with a user of the client device, or a content type of the content.

20. The computer program product of claim 10, wherein the content consumption condition is associated with at least one of a capability of the client device, a preference associated with a user of the client device, or a content type of the content.

* * * * *